(12) United States Patent
Gao et al.

(10) Patent No.: US 9,710,628 B2
(45) Date of Patent: Jul. 18, 2017

(54) UNLOCKING AN APPARATUS (71) Applicant: NOKIA TECHNOLOGIES OY, Espoo (FI)

(72) Inventors: Bin Gao, Beijing (CN); Song Liu, Beijing (CN); Zhuoyuan Liao, Beijing (CN); Li Luo, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/654,540

(22) PCT Filed: Dec. 21, 2012

(86) PCT No.: PCT/CN2012/087162
§ 371 (c)(1),
(2) Date: Jun. 21, 2015

(87) PCT Pub. No.: WO2014/094297
PCT Pub. Date: Jun. 26, 2014

(65) Prior Publication Data
US 2015/0339466 A1    Nov. 26, 2015

(51) Int. Cl.
G06F 17/30    (2006.01)
G06F 21/31    (2013.01)
G06F 21/36    (2013.01)

(52) U.S. Cl.
CPC .............. G06F 21/31 (2013.01); G06F 21/36 (2013.01)

(58) Field of Classification Search
CPC ................................................ H04L 2012/5636
See application file for complete search history.

(56) References Cited

U.S. PATENT DOCUMENTS

2004/0230818 A1* 11/2004 Craft ....................... G06F 21/51
                                                                  713/193
2010/0199334 A1*  8/2010 Ehrensvard ............. G06F 21/34
                                                                  726/5
(Continued)

FOREIGN PATENT DOCUMENTS

CN    101980131 A    2/2011
CN    102479022 A    5/2012
(Continued)

OTHER PUBLICATIONS

*Nokia N9-Wikipedia, the free encyclopedia* [online] [retrieved Dec. 2, 2015]. Retrieved via the Internet Archive Wayback Machine at https://web.archive.org/web/20150527134030/http://en.wikipedia.org/wiki/Nokia_N9 (May 5, 2015) 9 pages.
(Continued)

*Primary Examiner* — Josnel Jeudy
(74) *Attorney, Agent, or Firm* — Alston & Bird LLP (57) ABSTRACT

An apparatus, method, and computer program product for: receiving a user input comprising an unlock sequence; comparing the user input to a predefined unlock sequence comprising a static part and a dynamic part; in response to determining that a first part of the user input complies with the static part of the predefined unlock sequence, performing an unlock operation; and in response to determining that a second part of the user input complies with the dynamic part of the predefined unlock sequence, performing an action based on the second part of the user input.

17 Claims, 7 Drawing Sheets

(56) References Cited

U.S. PATENT DOCUMENTS

2011/0247065 A1   10/2011  Melnyk
2013/0283199 A1*  10/2013  Selig .................... G06F 3/0484
                                                                  715/781

FOREIGN PATENT DOCUMENTS

| CN | 102624979 A | 8/2012 |
|---|---|---|
| EP | 2 219 105 A1 | 8/2010 |
| GB | 2486707 A | 6/2012 |
| WO | WO 2009/004435 A2 | 1/2009 |
| WO | WO 2010/037898 A1 | 4/2010 |

OTHER PUBLICATIONS

Bournique, Dennis, *Nokia N9 MeeGo/Harmattan Swipe UI Tips and Tricks/ Wap Review* [online] [retrieved Dec. 2, 2015]. Retrieved from the Internet: <URL: http://wapreview.com/15554/>. (Oct. 20, 2011) 9 pages.
*Nokia N9hands-on: First look*—p. 3—GSMArena.com [online] [retrieved Dec. 2, 2015]. Retrieved from the Internet: <URL: http://www.gsmarena.com/nokia_n9-review-610p3.php (Jun. 22, 2011) 3 pages.
*Nokia N9reveiw: Once in a lifetime*—p. 4—GSMArena.com [online] [retrieved Dec. 2, 2015]. Retrieved from the Internet: <URL: http://www.gsmarena.com/nokia_n9-review-659p4.php (Oct. 14, 2011) 4 pages.
International Search Report and Written Opinion of the International Searching Authority for corresponding International Patent Cooperation Treaty Application PCT/CN2012/087162, dated Sep. 19, 2013, 8 pages.

* cited by examiner

UNLOCKING AN APPARATUS

RELATED APPLICATION

This application was originally filed as Patent Cooperation Treaty Application No. PCT/CN2012/087162 filed Dec. 21, 2012.

TECHNICAL FIELD

The present application relates generally to unlocking an apparatus. The present application further relates to unlocking an apparatus and performing an action.

BACKGROUND

A user interface of an electronic device typically enables a variety of user inputs and different kinds of user interaction with the electronic devices. Different kinds of user inputs may include, for example, inputting data by means of a hardware key, a touch screen, different kinds of sensors capable of detecting movement and/or orientation of the electronic device, or speech recognition.

Sometimes it is desirable to prevent the use of, for example, unattended device by locking the device such that at least some functionality is disabled until the device has been unlocked.

SUMMARY

Various aspects of examples of the invention are set out in the claims.

According to a first example, there is provided a method comprising receiving a user input comprising an unlock sequence, comparing the user input to a predefined unlock sequence comprising a static part and a dynamic part, in response to determining that a first part of the user input complies with the static part of the predefined unlock sequence, performing an unlock operation, and in response to further determining that a second part of the user input complies with the dynamic part of the predefined unlock sequence, performing an action based on the second part of the user input.

According to a second example, there is provided an apparatus comprising a processor, memory including computer program code, the memory and the computer program code configured to, working with the processor, cause the apparatus to perform at least the following: receive a user input comprising an unlock sequence, compare the user input to a predefined unlock sequence comprising a static part and a dynamic part, in response to determining that a first part of user input complies with the static part of the predefined unlock sequence, cause an unlock operation to be performed, and in response to determining that a second part of the user input complies with the dynamic part of the predefined unlock sequence, cause an action to be performed based on the second part of the user input.

According to a third example, there is provided a computer program product comprising a computer-readable medium bearing computer program code embodied therein for use with a computer, the computer program code comprising: code receiving a user input comprising an unlock sequence, code for comparing the user input to a predefined unlock sequence comprising a static part and a dynamic part, code for, in response to determining that a first part of the user input complies with the static part of the predefined unlock sequence, performing an unlock operation, and code for, in response to determining that a second part of the user input complies with the dynamic part of the predefined unlock sequence, performing an action based on the second part of the user input.

According to a fourth example there is provided an apparatus, comprising means for receiving a user input comprising an unlock sequence, means for comparing the user input to a predefined unlock sequence comprising a static part and a dynamic part, means for, in response to determining that a first part of the user input complies with the static part of the predefined unlock sequence, performing an unlock operation, and means for, in response to determining that a second part of the user input complies with the dynamic part of the predefined unlock sequence, performing an action based on the second part of the user input.

According to a fifth example, there is provided a method comprising receiving an input for storage as a part of a reference input for comparison with a user input comprising an unlock sequence, determining a type of the input, in response to determining that the type of the input corresponds to a first input type, storing the input as a static part of the reference input, and in response to determining that the type of the input corresponds to a second input type, storing the input as a dynamic part of the reference input.

According to a sixth example, there is provided an apparatus comprising a processor, memory including computer program code, the memory and the computer program code configured to, working with the processor, cause the apparatus to perform at least the following: receive an input for storage as a part of a reference input for comparison with a user input comprising an unlock sequence, determine a type of the input, in response to determining that the type of the input corresponds to a first input type, store the input as a static part of the reference input and in response to determining that the type of the input corresponds to a second input type, store the input as a dynamic part of the reference input.

According to a seventh example, there is provided a computer program product comprising a computer-readable medium bearing computer program code embodied therein for use with a computer, the computer program code comprising: code for receiving an input for storage as a part of a reference input for comparison with a user input comprising an unlock sequence, code for determining a type of the input, code for, in response to determining that the type of the input corresponds to a first input type, storing the input as a static part of the reference input, and code for, in response to determining that the type of the input corresponds to a second input type, storing the input as a dynamic part of the reference input.

According to an eight example there is provided an apparatus, comprising means for receiving an input for storage as a part of a reference input for comparison with a user input comprising an unlock sequence, means for determining a type of the input, means for, in response to determining that the type of the input corresponds to a first input type, storing the input as a static part of the reference input, and means for, in response to determining that the type of the input corresponds to a second input type, storing the input as a dynamic part of the reference input

BRIEF DESCRIPTION OF THE DRAWINGS

For a more complete understanding of example embodiments, reference is now made to the following descriptions taken in connection with the accompanying drawings in which.

DETAILED DESCRIPTION OF THE DRAWINGS

An example embodiment and its potential advantages are understood by referring to FIGS. 1 through 7 of the drawings.

Example embodiments relate to user operations on an apparatus, for example to a user interface and to switching a device from a locked mode to an unlocked or a partially locked mode. According to an example embodiment, an apparatus is unlocked and an action is performed. In an example, an action to be performed is defined while unlocking the apparatus. The action may comprise, for example, launching an application, presenting notification information and/or performing a combined action. For example, a combined action may comprise launching more than one application, launching an application and providing a user interface option, presenting limited notification information or a combination thereof. In an example, a combined action may comprise an action limited by a criterion. For example, a combined action may comprise a logical AND-operation or a logical OR-operation. Example embodiments also relate to defining an unlock sequence in terms of storing a reference input. A user input comprising an unlock sequence is compared to the reference input and based on the comparison it is determined whether the unlock sequence is a valid unlock sequence for causing an unlock operation to be performed. The unlock operation may be, for example, unlocking an apparatus.

Defining an unlock sequence in terms of storing a reference input and unlocking the apparatus based on user input comprising an unlock sequence may be performed by different objects such as different modules that complement each other or by different objects such as different modules that work together.

Figure 1:
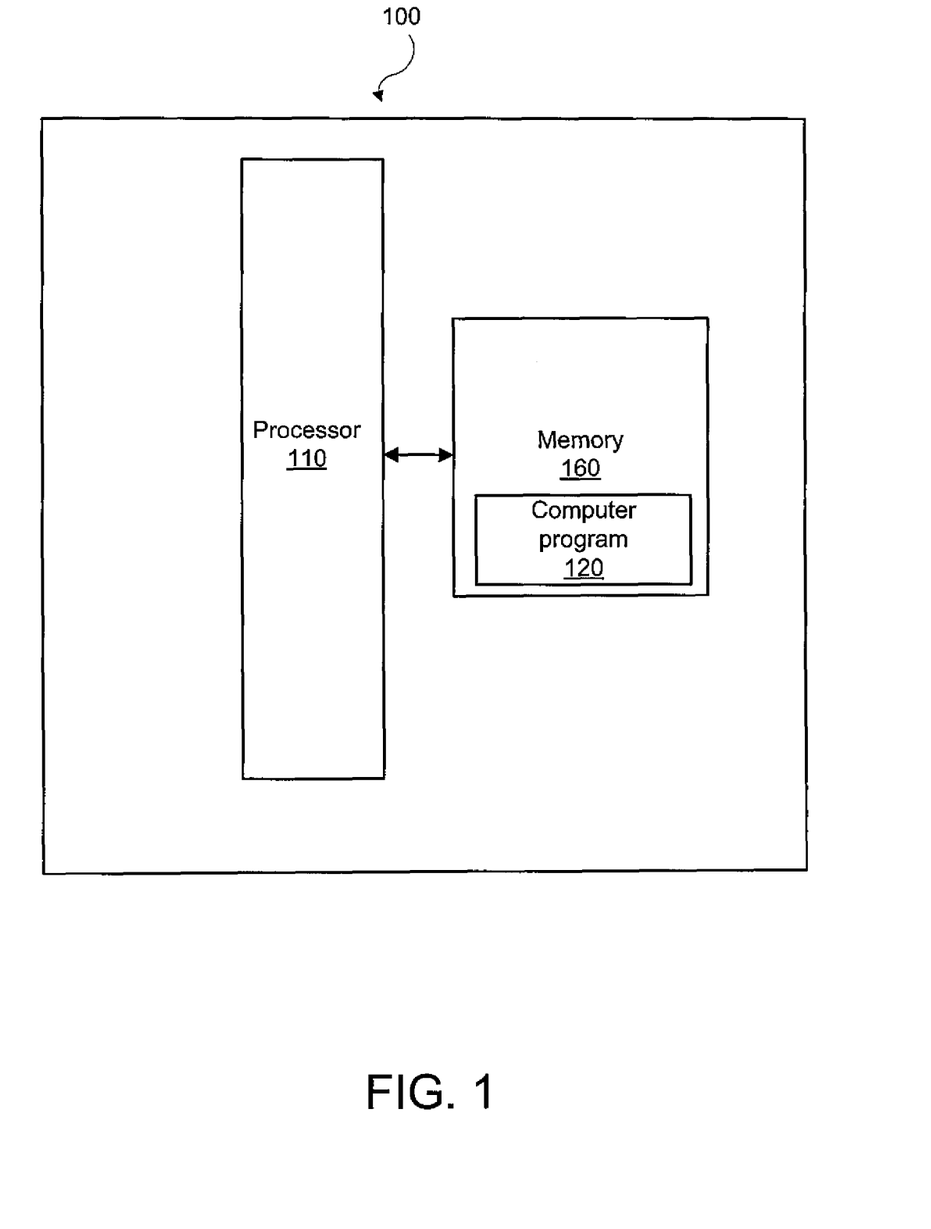
FIG. 1 shows a block diagram of an example apparatus in which example embodiments of the disclosed embodiments may be applied.

FIG. 1 is a block diagram depicting an apparatus 100 operating in accordance with an example embodiment of the invention. The apparatus 100 may, for example, be an electronic device such as a chip or a chip-set. The apparatus 100 includes a processor 110 and a memory 160. In other examples, the apparatus 100 may comprise multiple processors.

In the example of FIG. 1, the processor 110 is a control unit that is operatively connected to read from and write to the memory 160. The processor 110 may also be configured to receive control signals to the processor 110 received via an input interface and/or the processor 110 may be configured to output control signals by the processor 110 via an output interface. In an example embodiment the processor 110 may be configured to convert the received control signals into appropriate commands for controlling functionalities of the apparatus.

The memory 160 stores computer program instructions 120 which when loaded into the processor 110 control the operation of the apparatus 100 as explained below. In other examples, the apparatus 100 may comprise more than one memory 160 or different kinds of storage devices.

Computer program instructions 120 for enabling implementations of example embodiments of the invention or a part of such computer program instructions may be loaded onto the apparatus 100 by the manufacturer of the apparatus 100, by a user of the apparatus 100, or by the apparatus 100 itself based on a download program, or the instructions can be pushed to the apparatus 100 by an external device. The computer program instructions may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
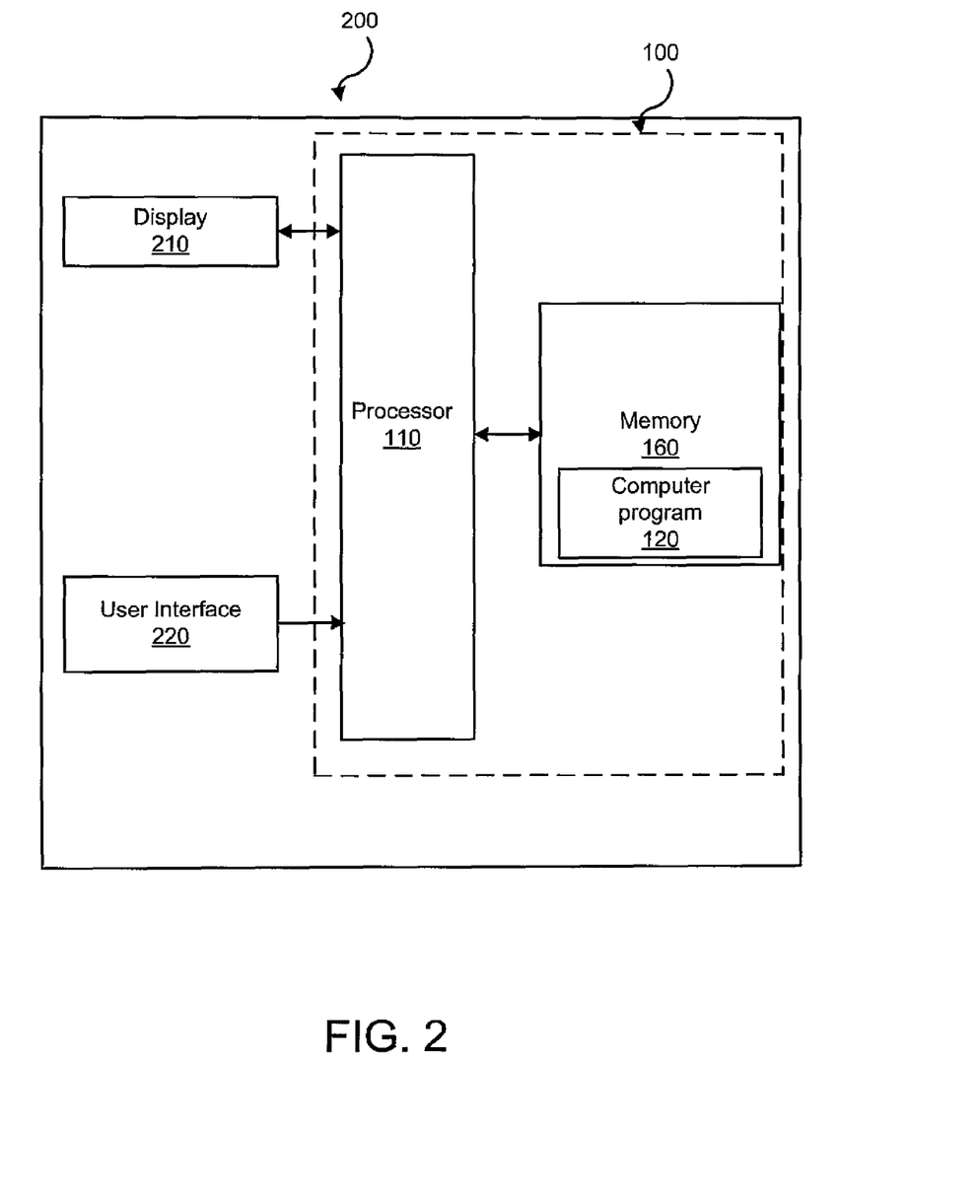
FIG. 2 shows a block diagram of another example apparatus in which example embodiments of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a CD-DVD or Blu-ray player, or a media player. In the examples of FIGS. 2 to 5 it is assumed the apparatus 200 is a mobile computing device.

In this example, the mobile computing device 200 is illustrated as comprising the apparatus 100, a display 210 and a user interface 220. However, the display 210 and/or UI 220 may be external to the apparatus 200 but in communication with it. In some examples the display 210 may be incorporated into the user interface 220: for example, the user interface 220 may include a touch screen display.

In the example of FIG. 2 the user interface 220 is configured to enable inputting and accessing information in the apparatus 200. According to an example embodiment, the user interface 220 comprises a surface capable of receiving user inputs. The surface may be an input surface such as a touch screen or a touch pad. In some example embodiments, the apparatus 200 may include both a touch screen and a touch pad or multiple surfaces capable of receiving user inputs. A touch screen may be configured not to only enable accessing and/or inputting information but also to display user interface objects, while a touch pad may be configured to enable accessing and/or inputting information and a separate display may be provided. In some example embodiments, no display is provided. A user may input and access information by using a suitable input means such as a pointing means, one or more fingers, a stylus or a digital pen.

In an example embodiment, inputting and accessing information is performed by touching the surface such as the surface of a touch screen display 210 or a touch pad. Additionally or alternatively, proximity of an input means such as a finger or a stylus may be detected and inputting and accessing information may be performed by hovering the finger or the stylus over the surface. In a further example embodiment the surface may be a multi-touch surface configured to detect multiple at least partially concurrent touches on the surface.

A touch screen or a touch pad may be based on one or more of several different technologies. For example, different touch screen and pad technologies include resistive, capacitive, Surface Acoustic Wave (SAW), infrared, strain gauge, optical imaging, dispersive signal technology and acoustic pulse recognition touch screens. A touch screen or a touch pad may also operate using a combination of different technologies.

Additionally or alternatively, the user interface 220 may also comprise a manually operable control such as a button, a key, a touch pad, a joystick, a stylus, a pen, a roller, a rocker, a keypad, a keyboard or any suitable input mechanism for inputting and/or accessing information. Further examples include a microphone, a speech recognition system, eye movement recognition system, acceleration, tilt and/or movement based input system.

In the example of FIG. 2, the processor 110 is configured to cause the mobile computing device 200 to receive an input for storage as a part of a reference input for comparison with a user input comprising an unlock sequence. When a user wishes to unlock the mobile computing device 200 by inputting an unlock sequence, the unlock sequence is compared to the reference input, and based on the comparison it is determined by the processor 110 whether the unlock sequence is a valid unlock sequence for unlocking the device 200.

According to an example embodiment the processor 110 is configured to determine a type of the input. For example, the processor 110 may be configured to determine that the type of the input comprises a number input, a character input, a symbol input, a letter input, a gesture input, a hovering input, a motion input, a selection input or any other type of input. Determining the type of the input comprises categorizing different inputs into one or more of a plurality of types based on at least one criterion. If an input does not match any of the input types, the input may be categorized according to a default type.

The processor 110 is further configured to determine that the type of the input corresponds to a first input type and in response to determining that the type of the input corresponds to the first input type, store the input as a static part of the reference input.

Determining that the type of the input corresponds to a first input type may comprise, for example, comparing the input type to information defining the first input type. The information defining the first input type may be provided by the user, the manufacturer of the mobile computing device 200 or it may be received from the memory 160. Alternatively, the first input type may be automatically determined by the processor 110 based on content of the reference input. For example, the first input type may be a type of input occurring most often within a predefined time frame, used most often by the user, or occurring as the first received input of the static part. In a further example, the first input type may be determined based on one or more predefined criteria such as determining that the input represents a number, a character, a symbol, a letter, a gesture, a motion, or a selection predefined by e.g. the user, the manufacturer of the mobile computing device 200 or a developer of a software application.

In the example embodiment of FIG. 2, the processor 110 is further configured to determine that the type of the input corresponds to a second input type and in response to determining that the type of the input corresponds to the second input type, store the input as a dynamic part of the reference input. Determining that the type of the input corresponds to a second input type may comprise determining that the type of the input does not correspond to the first input type. Alternatively, the determination that the type of the input corresponds to the second input type may be based upon an independent determination similar to that described above for the first input type.

Storing the input as a dynamic part of the reference input may comprise storing the input as a wildcard. Storing the input as a wildcard may comprise replacing one or more inputs of the second type with a dedicated representation such as a special character that stands for a non-static input. Hence, storing the input as a wildcard enables interpreting a portion of a user input comprising an unlock sequence as complying with the dynamic part of the reference input even though the portion of the user input may not be identical to the corresponding portion of the reference input.

The wildcard may stand for an empty set, one or more applications, one or more functionalities, one or more features, one or more items, one or more widgets, one or more user interface components, one or more touch gestures, one or more motion gestures, one or more pieces of received information, one or more inputs or a combination thereof.

For example, it is assumed that the reference input is '1', '2', 'wildcard', '3', '4'. In this example, the static part is '1', '2', '3', '4' and the dynamic part is 'wildcard'. Therefore, the processor 110 is configured to determine that the first part of the user input complies with the static part of the reference input, if the user inputs '1', '2', '3', '4'. The processor 110 is also configured to determine that the first part of the user input complies with the static part of the reference input, if the user inputs '1', '2', 'email (e.g. selecting a representation of an email application)', '3', '4'. In this example the processor 110 is also configured to determine that the second part of the user input complies with the dynamic part of the reference input, since in this example the 'wildcard' stands for an input with an unlimited type and/or length, and 'email' fulfills that criterion. Similarly, the processor 110 is also configured to determine that the first part of the user input complies with the static part of the reference input, if the user inputs '1', '2', 'email' 'picture file (e.g. selecting a representation of a picture file)', '3', '4'.

The processor 110 may be configured to receive an indication that a user has initiated defining an unlock sequence. The processor 110 may be configured to perform that detection automatically based on user input, based on a received instruction by the user, or according to any other suitable basis. The processor 110 may further be configured to cause, in response to detecting that a user has initiated defining an unlock sequence, the disablement of one or more functionalities of the mobile computing device 200. As an example, the processor 110 may be configured to disable launching applications in response to detecting that a user has initiated defining an unlock sequence. Hence, an application may not be launched, but the processor 110 is configured to receive information on selecting an application by a user. Without limiting the scope of the claims, an advantage of disabling one or more functionalities of the mobile computing device 200 upon defining an unlock sequence may be that a user has an expanded variety of selectable objects. For example, typically selecting an application icon by a user causes activating or launching an application associated to the application icon. However, upon defining an unlock sequence a user may wish to select an application icon to represent a dynamic part of the reference input without actually activating or launching the application associated to the application icon. Therefore, by disabling one or more functionalities of the mobile computing device, the user may in fact have more options upon defining the unlock sequence.

The processor 110 may further be configured to re-enable the one or more functionalities in response to detecting that defining the unlock sequence has finished. For example, the processor 110 may be configured to detect that defining the unlock sequence has finished by detecting the termination of the reference input. That may be detected either automatically or based on information indicating that a user has pressed a confirmation button or given an instruction to exit a unlock sequence set up mode, or otherwise detecting that defining the unlock sequence has finished based on one or more pre-defined criteria. The reference input may be stored as a pre-defined unlock sequence in the memory 160.

In the example of FIG. 2, the processor 110 is configured to enable defining an unlock sequence. The processor 110 may further be configured to receive a user input comprising an unlock sequence and cause an unlocking operation to be performed. However, it should be noted that in some examples these may not be done by the same processor, but may be done by different processors.

As mentioned above, the processor 110 is configured to cause the mobile computing device to receive a user input comprising an unlock sequence and compare the user input to a predefined unlock sequence comprising a static part and a dynamic part. The predefined unlock sequence may be a result of defining an unlock sequence in terms of receiving a reference input as described above. Alternatively, the predefined unlock sequence may be received from an external device by the processor 110, from the memory 160 or it may be provided by the manufacturer of the mobile computing device 200.

The unlock sequence may comprise a sequence of inputs. The sequence of inputs may be input by a user of the mobile computing device 200. The unlock sequence may comprise, for example, a sequence of numbers, letters, characters, selected items, touch gestures, motion gestures, pictures or user interface views such as application sub-parts or areas of a user interface selected by the user.

The unlock sequence comprises a static part and a dynamic part. The static part is static in the sense that it needs to comply with the static part of the predefined unlock sequence to enable unlocking the mobile computing device 200 and it remains the same unless the predefined unlock sequence is changed by the user. The dynamic part is dynamic in the sense that it needs to comply with the dynamic part of the predefined unlock sequence, but it does not need to be identical the predefined unlock sequence. In should be noted that the dynamic part may also be an empty set.

According to an example embodiment, the processor 110 is configured to determine that a first part of the user input complies with the static part of the predefined unlock sequence. The first part of the user input complies with the static part of the predefined unlock sequence when the first part of the user input matches with the static part of the unlock sequence. For example, if the static part of the predefined unlock sequence comprises numbers, the first part of the user input complies with the static part of the predefined unlock sequence when the static part of the predefined unlock sequence comprises the same numbers in the same order. The processor 110 is further configured to cause an unlock operation to be performed in response to this determination. The unlock operation may comprise unlocking the user interface of the mobile computing device 200 or the device itself. Unlocking may comprise making one or more features or functionalities available to the user.

In an example embodiment unlocking the mobile communication device 200 comprises switching from a restricted mode where some features or functionalities are unavailable, to a partial mode where more features or functionalities are available to the user than in the restricted mode, or to a full mode where more features or functionalities are available to the user than in the partial mode.

The processor 110 may be configured to determine that a first part of the user input does not comply with the static part of the predefined unlock sequence. In an example, the processor 110 is further configured to keep the apparatus locked in response to determining that a first part of the user input does not comply with the static part of the predefined unlock sequence.

The processor 110 may further be configured to determine that a second part of the user input complies with the dynamic part of the predefined unlock sequence. As an example, the second part of the user input complies with the dynamic part of the predefined unlock sequence when the relative location of the second part within the user input matches with the relative location of the dynamic part within the predefined unlock sequence. It should be noted that the second part of the user input may comply with the dynamic part of the predefined unlock sequence even if the second part and the dynamic part are not identical and/or if the second part and the dynamic part differ in length.

The processor 110 is further configured to cause an action to be performed based on the second part of the user input in response to determining that a second part of the user input complies with the dynamic part of the predefined unlock sequence. In an example, the choice of action is in dependence upon the second part of the user input.

The processor 110 may be configured to determine that a second part of the user input does not comply with the dynamic part of the predefined unlock sequence. In an example, the processor 110 is further configured to cause an unlock operation to be performed in response to determining that the first part of the user input complies with the static part of the predefined unlock sequence and the second part of the user input does not comply with the dynamic part of the predefined unlock sequence. In other words, in some embodiments, as long as the first part complies with the static part of the predefined unlock sequence the unlock operation may be performed. In this way, a user may unlock a device without performing an action by not inputting a second part of the user input. However, in some example embodiments it may be possible to define, for example, by the user that both the first and the second part of the user input need to comply with the static and the dynamic part, respectively, to perform the unlock operation.

In an example embodiment the second part of the user input may be embedded in the first part of the user input. For example, the unlock sequence may start with a portion of the first part, comprise a dynamic part in the middle and then continue with the remaining portion of the first part. In an example embodiment the processor 110 is configured to determine that the second part of the user input is embedded in the first part of the user input. The processor 110 may also be configured to determine that the first part of the user input is embedded in the second part of the user input. Hence, the first part of the user input and the second part of the user input may both be continuous or one of both the first and the second part of the user input may be discontinuous. In the event of discontinuity, the positions of the first and the second part may be interleaved. In other words, one part may be embedded into another in terms of one part occurring within the other part.

According to an example embodiment, the second part of the user input comprises a selected representation of an application. The selected representation may comprise, for example, a selectable item representing an application. A selectable item may be an application icon, a piece of text representing an application or any other indicator associated to an application. For example, the first part of the user input may be '1', '2', '3', '4' and the second part of the user input may be 'telephone application'. In this example, the user input could be, for example, '1', '2', 'telephone application', '3', '4'. It should be noted that even though in this example the 'telephone application' is embedded in the first part of the user input such that it is between '2' and '3', it could be embedded between '1' and '2', or '3' and '4' as well. According to another example embodiment, the user input starts with the second part of the user input. For example, the user input could be 'telephone application', '1', '2', '3', '4'. According to a further example embodiment, the user input ends with the second part of the user input. For example, the user input could be '1', '2', '3', '4', 'telephone application'.

In an example embodiment the second part of the user input comprises selecting representations of more than one application. For example, the user input could be '1', '2', 'camera', 'social media', '3', '4'. In another example, the user input could be 'camera', 'social media', '1', '2', '3', '4'. In a further example, the user input could be '1', '2', '3', '4', 'camera', 'social media'. In a yet further example, the received unlock code could be '1', 'camera', '2', '3', 'social media', '4'. According to an example embodiment, the user input may be any combination of the first part and the second part of the user input. The first part and the second part may both be continuous, discontinuous, or one can be continuous and the other discontinuous.

According to an example embodiment the processor 110 is configured to cause an action to be performed based on the second part of the user input. The choice of action may be in dependence upon the second part of the user input. An action may comprise, for example, launching or activating an application, a feature, a functionality, changing a setting in the mobile computing device 200, displaying information on the display 210 or in the user interface 220, presenting audible, tactile, haptic and/or any other kind of information to the user.

In an example embodiment the action to be performed comprises launching an application based on the second part of the user input. In other words, the processor 110 may be configured to cause an application to be launched. In another example embodiment the processor 110 is configured to launch more than one application based on the second part of the user input. For example, the processor 110 may be configured to launch one or more of the following: a camera application, a phone application, a phonebook application, an email application, an internet browser, a messaging application, a calendar application, a map application, a gallery application, a music application, a media player, a gaming application, an electronic market application, a navigation application, a TV application, an office application, a travelling application, a file transfer application, a sharing application, a recorder, and a news application.

According to an example embodiment, the second part of the user input comprises a plurality of sub-parts, each sub-part complying with the dynamic part of the predefined unlock sequence and the processor 110 is configured to cause a combined action to be performed based on the plurality of sub-parts of the user input. For example, if the second part of the user input comprises a selected representation of a 'camera' application and 'social media' application, the processor 110 may be configured to cause launching a camera application for capturing a picture and enable sending the picture to social media. Therefore, a combined action may be an action that is performed based on the functionality of two or more applications. In some example embodiments the two functions need to be cooperative. A combined action may also be an action that is performed based on two pieces of information. For example, if the second part of the user input comprises selecting a representation of a contact card associated to a phonebook application and a notification information representing missed calls information, the processor 110 may be configured to cause presenting missed calls information for a contact. Therefore, a sub-part of the second part of the user input may be used as a limiting component. A further possibility is that a combined action may be an action that is performed based on the functionality of one application and a piece of notification information.

According to another example embodiment, the second part of the user input comprises a plurality of sub-parts, each sub-part complying with the dynamic part of the predefined unlock sequence and the processor 110 is configured to cause multiple actions to be performed based on the plurality of sub-parts of the user input. The processor 110 may be configured to cause parallel actions to be performed based on each sub-part independently. For example, the second part of the user input may comprise a selection of an icon representing a first application and a selection of an icon representing a second application. The processor 110 may be configured to cause launching the respective applications independent of each other. In this way, the user can, for example, run several applications in parallel such as check new emails in the email application and browse the internet with a web browser.

In another example, the processor 110 may be configured to cause sequential actions to be performed based on each sub-part. For example, the processor 110 may be configured to first cause a first action to be performed and then cause a second action to be performed based on a predefined criterion. The criterion may comprise a user finishing the first action, a user cancelling the first action, a time delay for performing the second action or any other appropriate criterion such as a combination of criteria. For example, assuming the user selected the email icon and the web browser icon as the second part of the user input and the criterion comprises a time delay for launching the web browser: the user could quickly check new emails and if the user has closed the email application before the time delay has expired, the processor 110 could cause launching the web browser application.

Referring back to the example of FIG. 2 and as mentioned earlier, the mobile computing device 200 may also include a display 210. The display 210 is configured to receive control signals provided by the processor 110 and present visual information such as user interface objects for a user. However, it is also possible that the apparatus 200 does not include a display or the display is an external display, separate from the apparatus 200 itself. According to an example embodiment the display may be incorporated within the user interface 220.

Additionally or alternatively, the mobile computing device 200 may include another kind of an output device such as a tactile feedback system for presenting tactile and/or haptic information for a user. The tactile feedback system may be configured to receive control signals provided by the processor 110. The tactile feedback system may be configured to indicate a completed operation or to indicate selecting an operation, for example. In an example embodiment a tactile feedback system may cause the mobile computing device 200 to vibrate in a certain way to inform a user of an activated and/or completed operation.

FIGS. 3a to 3f illustrate an example user interface incorporating aspects of the disclosed embodiments. In this example, the user interface may be comprised by the example apparatus 200 of FIG. 2 such as a mobile computing device. The mobile computing device comprises an example apparatus 100 of FIG. 1 and a touch screen display which allows inputting and accessing information via the touch screen display 210. In the example of FIGS. 3a to 3f, the touch screen display 210 is further configured to present user interface objects such as a focus area 310, keys 330 and application icons corresponding to applications such as a contacts application 350, an email application 360, a music player 370 and selectable user interface elements 340 for browsing through available applications. The processor 110 is configured to cause launching an application 350, 360, 370 in response to receiving information indicating a selected application icon by a user. The mobile computing device 200 of FIGS. 3a to 3f may also comprise one or more virtual, soft or mechanical keys and/or additional and/or other components.

In the example of FIGS. 3a to 3f, a key may be selected, for example, by a user by touching the key 330 with a finger 320 or by hovering the finger 320 in close proximity of the key 330 without a direct contact with the key 330. Other examples of selecting a key may include, for example, selecting a key by tilting or moving the mobile computing device 200, by detecting eye movement, by using a touch gesture, a motion gesture or by using a pointer element such as a cursor.

FIGS. 3a to 3f illustrate an example of defining a reference input for comparison with a user input comprising an unlock sequence. The unlock sequence is the user input received by the mobile computing device 200, and it is input for performing an unlock operation, such as unlocking the mobile communication device 200. If the unlock sequence matches with the reference input, the mobile computing device 200 is switched from a locked mode to an unlock mode.

The mobile computing device 200 may have entered a locked mode in response to receiving information of a locking input. The locking input may be received, for example, by receiving the locking input from a user, detecting a predefined period of user inactivity, detecting a fulfillment of a locking criterion, or in response to detecting a predefined battery level. When the mobile computing device 200 is in the locked mode, one or more of the functionalities of the device are not available to the user. Without limiting the scope of the claims, an advantage of a locked mode is that accidental user input may be avoided.

Figure 3A:
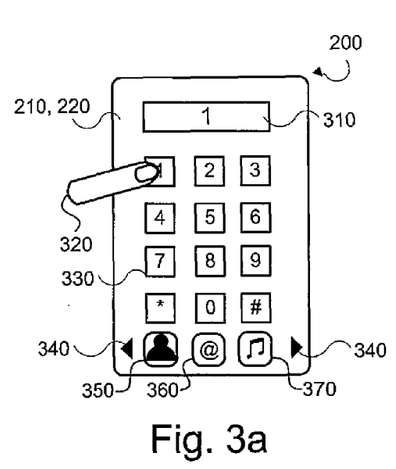
FIGS. 3a to 3f illustrate a user interface in accordance with an example embodiment of the invention.
Figure 3B:
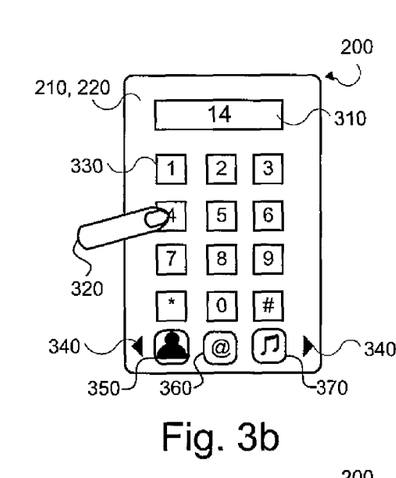
Figure 3C:
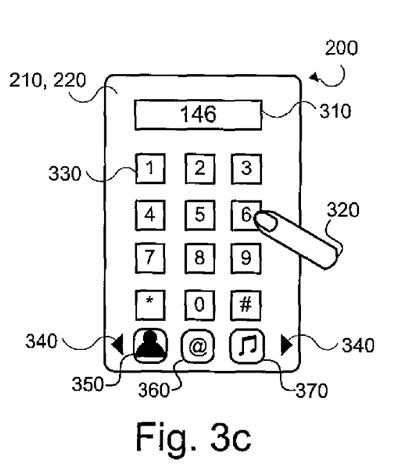
Figure 3D:
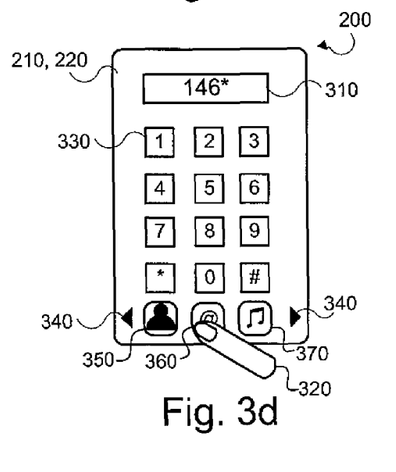

FIGS. 3a to 3c illustrate an example of a user defining an unlock sequence in terms of inputting a reference input. First, the user inputs numbers 1 (FIG. 3a), 4 (FIG. 3b) and 6 (FIG. 3c), each of which is stored as a part of a reference input. The processor 110 is configured to receive information on the inputs and cause presenting characters corresponding to the inputs in the focus area 310. In the example of FIG. 3d, while the user is still in the process of defining an unlock sequence, the user selects an icon representing the email application 360. The processor 110 is configured to receive information indicating the selected email application 360 and cause displaying in the focus area 310 a representation of the selected application. The representation of the selected application may be, for example, a character or any other kind of representation indicating the selected application.

As discussed earlier, the processor 110 is configured to determine a type of the input. In the example of FIGS. 3a to 3c, the processor 110 is configured to determine that the type of the input is a number input and in the example of FIG. 3d, the processor 110 is configured to determine that the type of the input is an input indicating a selected application icon. It should be noted that selecting an application icon does not cause launching the application associated to the application icon, because the processor 110 has caused disablement of launching applications during defining an unlock sequence.

The processor 110 is further configured to store the number input as a static part of the reference input, and the input indicating a selection of the email application as a dynamic part of the unlock sequence. In this example, there may be a predefined setting based on which number inputs are stored as a static part of the reference input. However, in other examples different criteria and/or different methods may be used for determining which input are considered as static inputs.

As illustrated in FIG. 3d, the dynamic part is replaced by a wildcard and indicated to the user by '*'. It may be possible to indicate the dynamic part in several different ways, for example, visually, audibly, providing tactile feedback or any combination thereof. In an example embodiment the dynamic part is not indicated to the user. An input representing the dynamic part is stored as a part of the reference input. Therefore, the reference input comprises 146*.

Figure 3E:
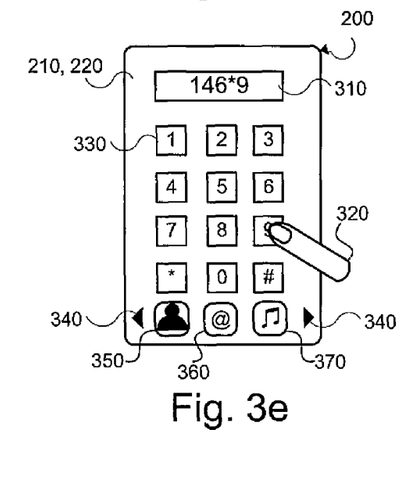
Figure 3F:
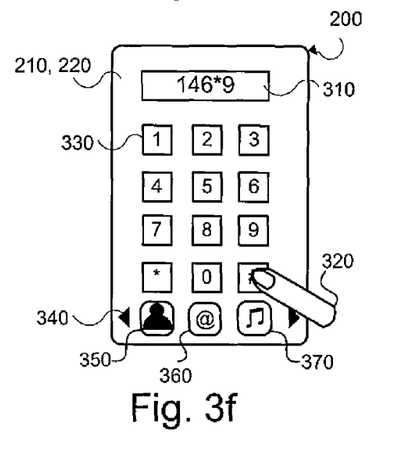

In the example of FIG. 3e, the user continues defining the unlock sequence by inputting number '9' that is stored as a part of the reference input and finally, in FIG. 3f, completes defining the unlock sequence by selecting an appropriate key or button, in this example pressing the hash mark '#'. As a result, the reference input is 146*9, wherein 146 and 9 are considered to be a static part of the unlock sequence and '*' is considered to be a dynamic part of the unlock sequence. According to this example, the dynamic part is embedded in the static part of the unlock sequence. Without limiting the scope of the claims, an advantage of embedding the dynamic part in the static part of the unlock sequence may be that the unlock sequence is more secure in terms of having multiple types of inputs within one unlock sequence. Another advantage may be that it is more difficult for an outsider to find out the correct unlock sequence since the dynamic part may vary in terms of content or length or both.

FIGS. 4a to 4f illustrate another example user interface incorporating aspects of the disclosed embodiments. The example of FIGS. 4a to 4f illustrates unlocking the mobile computing device 200 of earlier examples. The user interface of FIGS. 4a to 4f is similar to the user interface of FIGS. 3a to 3f.

Figure 4A:
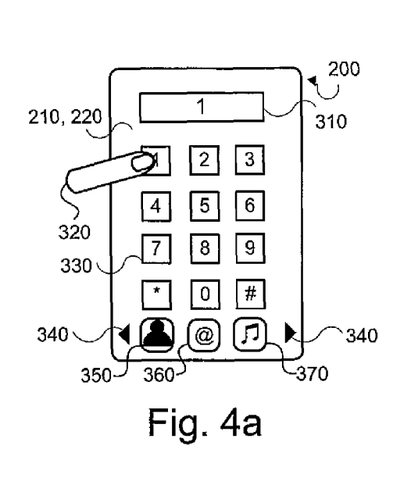
FIGS. 4a to 4f illustrate another user interface in accordance with an example embodiment of the invention.
Figure 4B:
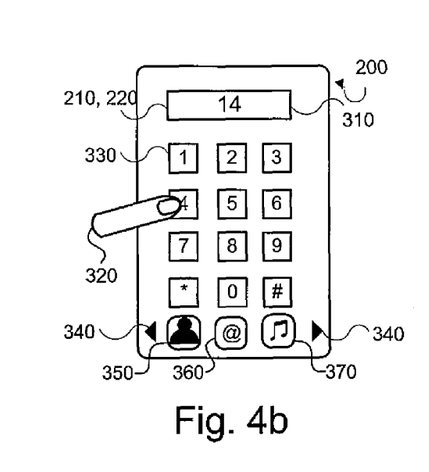
Figure 4C:
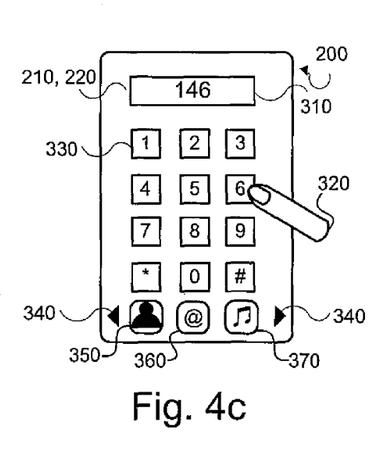
Figure 4D:
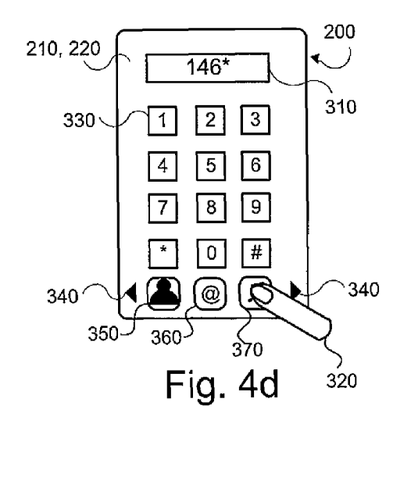
Figure 4E:
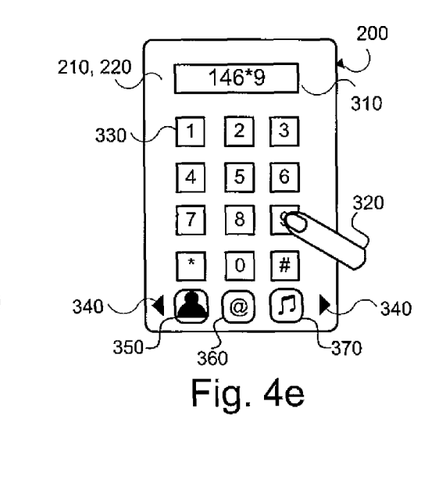

FIGS. 4a to 4f illustrate an example of performing an unlock operation. In this example, the unlock operation comprises unlocking the mobile computing device 200. The processor 110 is configured to receive a user input comprising an unlock sequence and to compare the user input to a predefined unlock sequence comprising a static part and a dynamic part. It is assumed that the predefined unlock sequence is the reference input stored in the example of FIGS. 3a to 3f for comparison with a user input comprising an unlock sequence. In other words, the reference input is 146*9, wherein 1, 4, 6 and 9 represent the static part and '*' represents the dynamic part. In FIGS. 4a, 4b and 4c, the user inputs '1', '4' and '6' by selecting corresponding number buttons 330 on the touch screen display 210. In FIG. 4d the user selects an icon representing 'music player' 370 and in FIG. 4e the user inputs '9' by selecting the corresponding number button 330 on the touch screen display 210.

The processor 110 is configured to, in response to determining that a first part of the user input complies with the static part of the predefined unlock sequence, cause an unlock operation to be performed, in this example unlocking the mobile computing device 200. In the example of FIGS. 4a to 4e, the user input 1, 4, 6, 9 matches to the static part defined in the example of FIGS. 3a to 3f and, as a result, the mobile computing device 200 is unlocked.

The processor 110 is further configured to determine that a second part of the user input complies with the dynamic part of the predefined unlock sequence. In the example of FIG. 3d the user defined an email application 360 as a part of the reference input. The selection of an email application 360 was replaced with a wildcard and the reference input was stored as a predefined unlock sequence. Hence, the wildcard represents a dynamic part of the predefined unlock sequence. In this example, the dynamic part of the predefined unlock sequence allows a user to input the identical, a different or no input as a part of the user input received by the mobile computing device 200. In FIG. 4d the user selected an icon representing a music player 370 application and according to this example, the processor 110 is configured to determine that selecting the icon representing the music player 370 complies with the dynamic part of the predefined unlock sequence. The determination was made based on the fact that the location of 'music player' 370 within the user input comprising an unlock sequence corresponds to the location of the dynamic part within the predefined unlock sequence. In other words, even though the representation of the application selected upon defining the reference input is different from the representation of the application selected upon receiving a user input comprising an unlock sequence, the processor 110 is configured to determine that the second part of the user input complies with the dynamic part of the predefined unlock sequence. In this example, the second part of the user input complies with the dynamic part of the predefined unlock sequence in the sense that the relative location of the second part within the user input and the relative location of the dynamic part within the predefined unlock sequence match.

Figure 4F:
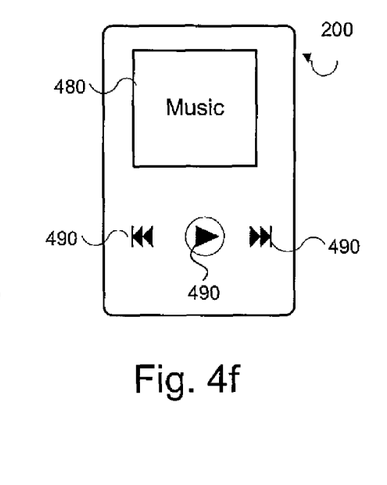

The processor 110 is further configured to cause an action to be performed based on the second part of the user input in response to determining that the second part of the user input complies with the dynamic part of the predefined unlock sequence. In the example of FIG. 4f, selecting the music player 370 as a part of the user input comprising an unlock sequence causes launching the music player 370 when the mobile computing device 200 is unlocked. The music player comprises user selectable controls 490 for controlling the music player and a display area 480 for displaying information as illustrated in FIG. 4f.

According to an example embodiment, the action may not be performed until the first part of the user input complies with the static part of the predefined unlock sequence. For example, in FIG. 4f, the music player 370 is launched only after the user has input the last number i.e. '9' of the predefined unlock sequence. In some example embodiments the action may be performed or initiated even before the user input complies with the static part of the predefined unlock sequence. For example, if the user selects downloading a large file when inputting the unlock sequence, the downloading may be initiated before the static part of the predefined unlock sequence is completely complied with.

Without limiting the scope of the claims, an advantage of an unlock sequence comprising a first part for causing an unlock operation to be performed and a second part for causing an action to be performed may be a decreased number of user interactions with an apparatus in a situation where a user wishes to, for example, both unlock the apparatus and launch an application. Another advantage is that a user may perform one or more actions directly from a locked mode.

Performing an action based or in dependence on the second part of the user input may comprise, for example, launching an application, presenting visual, audible or tactile information, activating a functionality or a setting, transmitting, sending or downloading an item, taking a picture, updating an entry, browsing the internet or making a note.

Figure 5A:
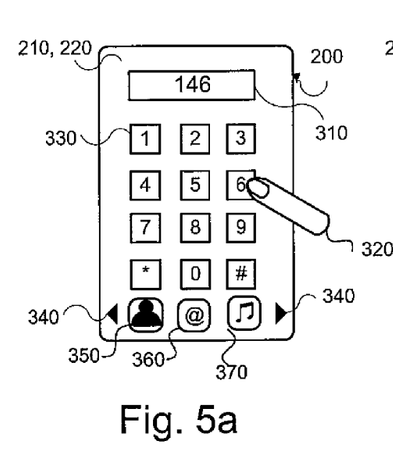
FIGS. 5a to 5f illustrate a further user interface in accordance with an example embodiment of the invention.

FIGS. 5a to 5f illustrate yet another example user interface incorporating aspects of the disclosed embodiments. The example mobile computing device 200 is the same as in the earlier examples and it is assumed that the predefined unlock sequence is the reference input stored in the example of FIGS. 3a to 3f. In other words, the predefined unlock sequence is 146*9 wherein 1, 4, 6 and 9 represent the static part and '*' represents the dynamic part. In the example of FIG. 5a, the user has already input '1', '4' and '6'.

Figure 5B:
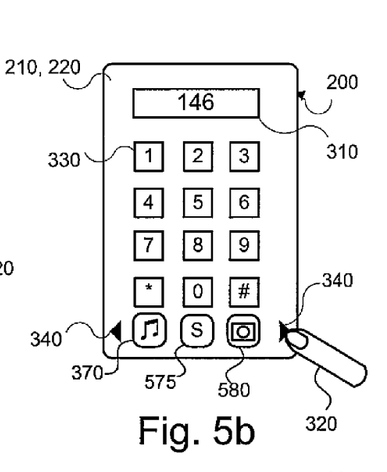

In the example of FIG. 5b, the processor 110 is configured to receive information indicating an input relating to a selectable user interface element 340 for browsing through available applications. According to an example embodiment, the processor 110 is configured to ignore one or more inputs during receiving a user input comprising an unlock sequence. The processor 110 may be configured to ignore one or more inputs neither complying with the static nor the dynamic part of the predefined unlock sequence during receiving the user input without compromising the validity of the user input. According to an example embodiment, the processor 110 is configured to pause receiving a user input comprising an unlock sequence in response to detecting an input indicating a transitional input for changing a set of selectable items. In the example of FIG. 5b the set of selectable items comprises application icons that can be selected by the user upon inputting the user input. The transitional input may be for example, an input for changing a view, a selection of items, changing a mode of the mobile computing device 200 or any combination thereof. In the example of FIG. 5b, the user selects the user interface element 340 twice to receive a selection of available applications comprising a music player 370, a social media application 575 and a camera application 580. The processor 110 is configured to ignore the activation of the user interface element 340 in terms of not taking into account one or more inputs relating to the user interface element for browsing available applications 340 when receiving the user input.

Figure 5C:
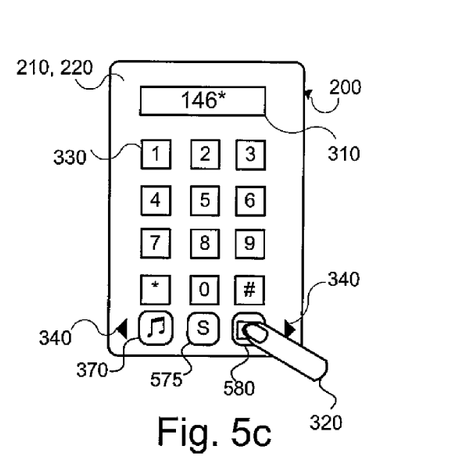

In the example of FIG. 5c the applications that the user wishes to select are available. The processor 110 is configured to resume receiving the user input in response to receiving information on a valid input. In the example of FIG. 5c, in response to receiving information indicating a selected representation of a camera application 580, the processor 110 resumes receiving the user input comprising an unlock sequence and includes the selection of the representation of the camera application 580 as a part of the user input. In response to selecting the representation of the camera application 580, '*' representing a second part of the user input is displayed in the focus area 310.

Figure 5D:
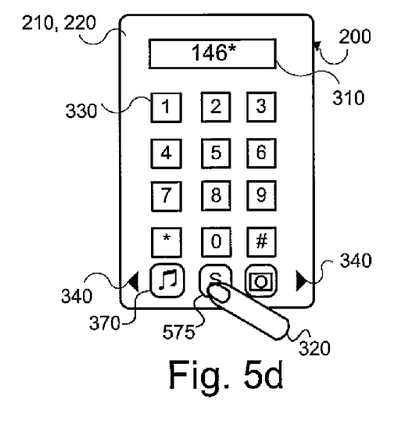
Figure 5E:
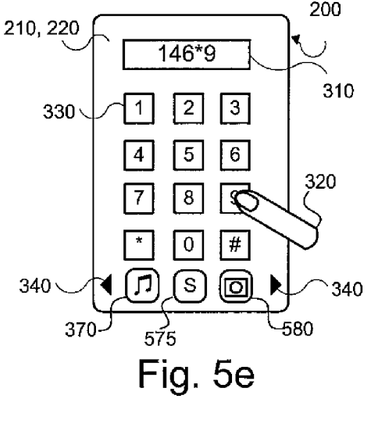
Figure 5F:
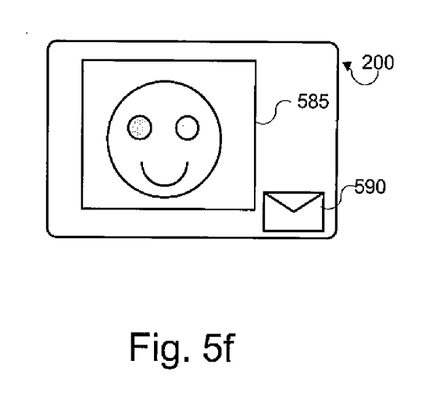

In the example of FIG. 5d the user selects a second representation of an application, namely a representation of a social media application 575. In this example, the second part of the user input comprises a plurality of sub-parts, namely the selection of the representation of the camera application and the representation the social media application, each sub-part complying with the dynamic part of the predefined unlock sequence. The processor 110 is configured to cause a combined action to be performed based on the plurality of sub-parts. In this example, the combined action comprises launching the camera application 580 and providing an option to send a picture that was taken to social media. In the example of FIG. 5f, a user has taken a picture 585 and an option to send the picture to social media 590 is provided for the user. According to an example embodiment, social media may comprise web- and/or mobile based technologies to enable interactive communication between people, companies and organizations, for example. Social media may include, for example, magazines, discussion forums on the Internet, blogs, multi-author blogs, microblogging, wikis, social networks, podcasts, photographs or pictures, video, rating and/or commenting, and social bookmarking.

It should be noted that even though in the examples of FIGS. 3a to 3f, 4a to 4f and 5a to 5f, the second part of the user input comprises one or more applications, the second part of the user input may also comprise additional or alternative inputs. For example, the second part of the user input may comprise a particular user interface view representing a portion of the user interface or a sub-application feature, a feature, a functionality, a setting, an icon, a data structure or any combination therefore. In an example embodiment, the processor 110 may be configured to cause entering a home screen view in response to determining that the second part of the user input comprises an item representing a home screen. A user may select a home screen icon upon entering the unlock sequence. In an example embodiment, the processor 110 may be configured to cause outputting notification information. The notification information may comprise, for example, one or more missed calls, messages or news. In the example a user may select an item representing notification information as a part of the user input comprising an unlock sequence.

As mentioned earlier, the processor 110 may be configured to perform a combined action based on the second part of the user input. In an example embodiment the processor 110 may be configured to perform a combined action based on the second part of the user input, wherein the second part comprises different types of selections. For example, the processor 110 may be configured to cause displaying the number of missed calls from a particular person in response determining that the second part of the user input comprises selecting a contact card and notification information. Therefore, the processor 110 may be configured to perform a logical AND-operation for items included in the second part of the user input. As another example, the user may select a selectable item representing a picture of an artist and a selectable item representing a music player to play all the songs from the artist. Alternatively or additionally, the processor 110 may be configured to perform a logical OR-operation for items included in the second part of the user input.

Figure 6:
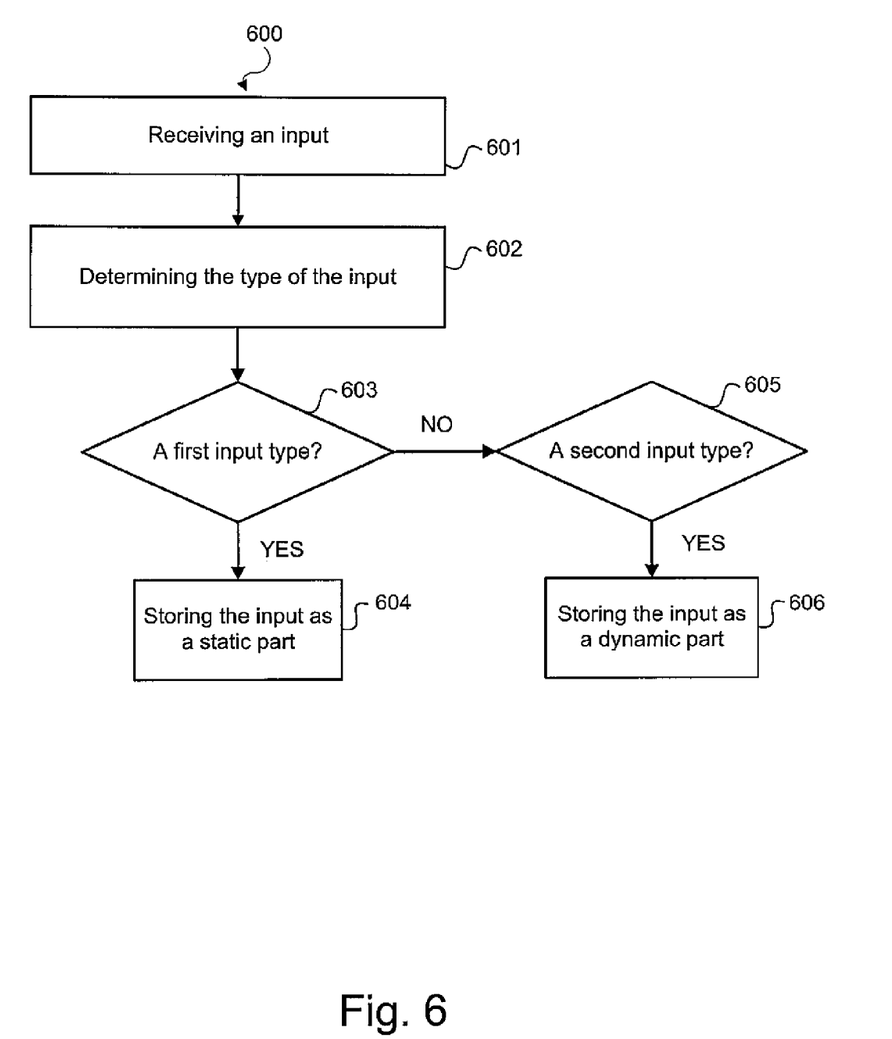
FIG. 6 illustrates an example method incorporating aspects of example embodiments of the invention.

FIG. 6 illustrates an example method 600 incorporating aspects of the previously disclosed embodiments. More specifically, the example method 600 illustrates defining an unlock sequence.

The method starts with the reception 601 of an input by a processor. The input is stored as a part of reference input for comparison with a user input comprising an unlock sequence.

The method further comprises determining the type of the input 602 by the processor.

In response to determining 603 that the type of the input corresponds to a first input type, the input is stored 604 as a static part of the reference input by the processor. On the other hand, in response to determining 605 that the type of the input corresponds to a second input type, the input is stored 606 as a dynamic part of the reference input. In some examples, in response to determining 603 that the type of the input does not correspond to a first input type, it may be automatically determined that the type of the input corresponds to a second input type.

According to an example embodiment, storing the input as a dynamic part of the reference input comprises storing the input as a wildcard. According to an example embodiment, storing one or more inputs as a dynamic part of the unlock sequence comprises storing the inputs as a single wildcard.

According to an example embodiment, the method further comprises, in response to detecting that a user has initiated defining an unlock sequence, disabling one or more functionalities of an apparatus.

Figure 7:
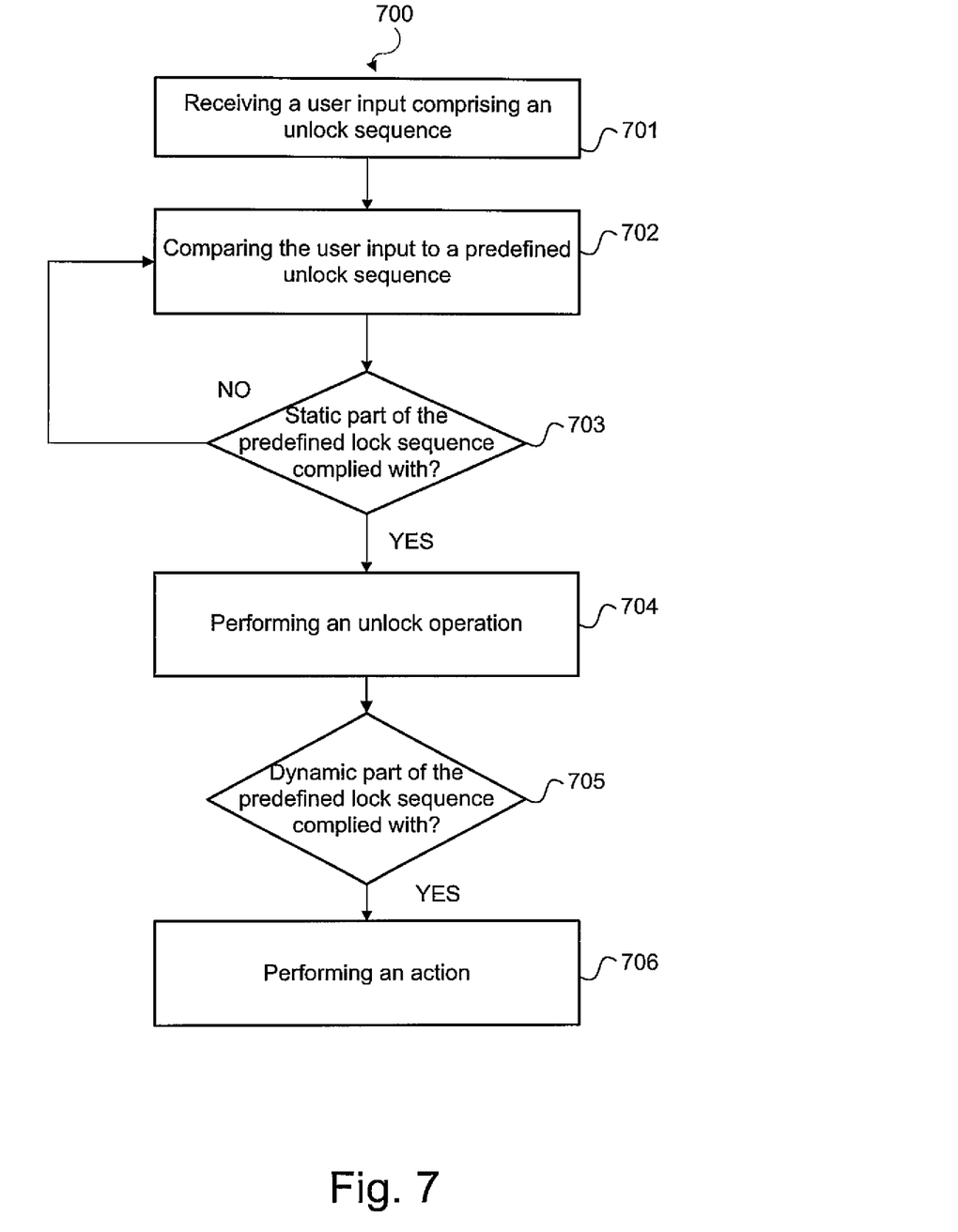
FIG. 7 illustrates another example method incorporating aspects of the example embodiments of the invention.

FIG. 7 illustrates an example method 700 incorporating aspects of the previously disclosed embodiments. More specifically, the example method 700 illustrates performing an unlock operation.

The method starts with receiving 701 by a processor 110 a user input comprising an unlock sequence and comparing 702 the user input to a predefined unlock sequence. The predefined unlock sequence may be the result of receiving a reference input.

The method further comprises, in response to determining 703 by the processor 110 that a first part of the user input complies with the static part of the predefined unlock sequence, performing an unlock operation. For example, assuming the static part of the predefined unlock sequence is 1, 4, 6, 9 as illustrated in the examples of FIGS. 3 to 5, the mobile computing device 200 may be unlocked in response to determining that the first part of the user input matches with the static part of the predefined unlock sequence. In an example embodiment, receiving the user input 703 may continue as long as the first part of the user input complies with the static part of the predefined unlock sequence. In an example embodiment, a user may cancel inputting the user input. For example, if the first part of the user input does not comply with the static part of the predefined unlock sequence, the user may prefer cancelling input of the unlock sequence.

The method further comprises, in response to determining 705 by the processor 110 that a second part of the user input complies with the dynamic part of the predefined unlock sequence, performing 706 an action based on the second part of the user input. In an example embodiment, in response to determining 705 by the processor 110 that a second part of the user input does not comply with the dynamic part of the predefined unlock sequence, the unlock operation may not be performed. However, in some examples it may be possible perform the unlock operation even if the second part of the user input does not comply with the dynamic part of the predefined unlock sequence.

Without in any way limiting the scope, interpretation, or application of the claims appearing below, a technical effect of one or more of the example embodiments disclosed herein is improving security when unlocking an apparatus. For example, it may be more difficult to detect the correct unlock sequence when the unlock sequence seems to differ from time to time in terms of the unlock sequence comprising a dynamic part. Another technical effect of one or more of the example embodiments disclosed herein is enabling performing an action directly from the locked mode of the apparatus.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   receiving a user input comprising an unlock sequence;
   determining that a first part of the user input complies with a static part of a predefined unlock sequence, wherein the static part of the predefined unlock sequence defines an input sequence for performing an unlock operation;
   in response to the determination that the first part of the user input complies with the static part of the predefined unlock sequence, performing an unlock operation;
   determining that a second part of the user input complies with a dynamic part of the predefined unlock sequence, wherein the dynamic part of the predefined unlock sequence defines a relative location for an input within the predefined unlock sequence for performing an action; and
   in response to the determination that the second part of the user input complies with the dynamic part of the predefined unlock sequence, performing an action based on the second part of the user input, wherein the second part of the user input identifies an application, and performing the action comprises launching the application.

2. The method according to claim 1, wherein the second part of the user input is embedded in the first part of the user input.

3. The method according to claim 1, wherein the second part of the user input comprises a plurality of sub-parts, each sub-part complying with the dynamic part of the predefined unlock sequence; and
   performing the action comprises performing a combined action based on the plurality of sub-parts of the second part of the user input.

4. The method according to claim 1, wherein the relative location of the second part of the user input corresponds to the relative location of the dynamic part of the predefined unlock sequence.

5. The method of claim 1, further comprising:
   receiving an input for storage as a part of the predefined unlock sequence;
   determining that a type of the input corresponds to a first input type;
   in response to the determination that the type of the input corresponds to the first input type, storing the input as the static part of the predefined unlock sequence;
   determining that the type of the input corresponds to a second input type; and
   in response to the determination that the type of the input corresponds to the second input type, storing the input as the dynamic part of the predefined unlock sequence.

6. The method according to claim 5, wherein storing the input as the dynamic part of the predefined unlock sequence comprises storing the input as a wildcard.

7. An apparatus, comprising:
   a processor, and
   memory including computer program code, the memory and the computer program code configured to, working with the processor, cause the apparatus to perform at least the following:
   receive a user input comprising an unlock sequence;
   determine that a first part of the user input complies with a static part of a predefined unlock sequence, wherein the static part of the predefined unlock sequence defines an input sequence for performing an unlock operation;
   in response to the determination that the first part of the user input complies with the static part of the predefined unlock sequence, perform an unlock operation;
   determine that a second part of the user input complies with a dynamic part of the predefined unlock sequence, wherein the dynamic part of the predefined unlock sequence defines a relative location for an input within the predefined unlock sequence for performing an action; and
   in response to the determination that the second part of the user input complies with the dynamic part of the predefined unlock sequence, perform an action based on the second part of the user input, wherein the second part of the user input identifies an application, and performing the action comprises launching the application.

8. The apparatus according to claim 7, wherein the second part of the user input is embedded in the first part of the user input.

9. The apparatus according to claim 7, wherein the second part of the user input comprises a plurality of sub-parts, each sub-part complying with the dynamic part of the predefined unlock sequence; and causing an action to be performed comprises causing a combined action to be performed based on the plurality of the sub-parts of the second part of the user input.

10. The apparatus according to claim 7, wherein the relative location of the second part of the user input corresponds to the relative location of the dynamic part of the predefined unlock sequence.

11. The apparatus of claim 7, wherein the memory and the computer program code are further configured to, working with the processor, cause the apparatus to perform at least the following:

receive an input for storage as a part of the predefined unlock sequence;

determine that a type of the input corresponds to a first input type;

in response to the determination that the type of the input corresponds to the first input type, storing the input as the static part of the predefined unlock sequence;

determining that the type of the input corresponds to a second input type; and in response to the determination that the type of the input corresponds to the second input type, storing the input as the dynamic part of the predefined unlock sequence.

12. The apparatus according to claim 11, wherein storing the input as the dynamic part of the unlock sequence comprises storing the input as a wildcard.

13. A computer program product comprising a non-transitory computer-readable medium bearing computer program code embodied therein for use with a computer, the computer program code comprising:

code for receiving a user input comprising an unlock sequence;

code for determining that a first part of the user input complies with a static part of a predefined unlock sequence, wherein the static part of the predefined unlock sequence defines an input sequence for performing an unlock operation;

code for, in response to the determination that the first part of the user input complies with the static part of the predefined unlock sequence, performing an unlock operation;

code for determining that a second part of the user input complies with a dynamic part of the predefined unlock sequence, wherein the dynamic part of the predefined unlock sequence defines a relative location for an input within the predefined unlock sequence for performing an action; and code for, in response to the determination that the second part of the user input complies with the dynamic part of the predefined unlock sequence, performing an action based on the second part of the user input, wherein the second part of the user input identifies an application, and performing the action comprises launching the application.

14. The computer program product according to claim 13, wherein the second part of the user input is embedded in the first part of the user input.

15. The computer program product according claim 13, wherein the second part of the user input comprises a plurality of sub-parts, each sub-part complying with the dynamic part of the predefined unlock sequence; and performing the action comprises performing a combined action based on the plurality of sub-parts of the second part of the user input.

16. The computer program product of claim 13, wherein the computer program code further comprises:

code for receiving an input for storage as a part of the predefined unlock sequence;

code for determining that a type of the input corresponds to a first input type;

code for, in response to the determination that the type of the input corresponds to the first input type, storing the input as the static part of the predefined unlock sequence;

code for determining that the type of the input corresponds to a second input type; and code for, in response to the determination that the type of the input corresponds to the second input type, storing the input as the dynamic part of the predefined unlock sequence.

17. The computer program product according to claim 16, wherein storing the input as the dynamic part of the predefined unlock sequence comprises storing the input as a wildcard.

* * * * *

UNITED STATES PATENT AND TRADEMARK OFFICE
CERTIFICATE OF CORRECTION

PATENT NO. : 9,710,628 B2
APPLICATION NO. : 14/654540
DATED : July 18, 2017
INVENTOR(S) : Gao et al.

Page 1 of 1

It is certified that error appears in the above-identified patent and that said Letters Patent is hereby corrected as shown below:

In the Claims

Column 20,
Line 17, "according" should read --according to--.

Signed and Sealed this
Twenty-eighth Day of May, 2019

Andrei Iancu
*Director of the United States Patent and Trademark Office*